Dec. 23, 1969 R. C. STEVENS 3,485,234
TUBULAR PRODUCTS AND METHOD OF MAKING SAME
Filed April 13, 1966
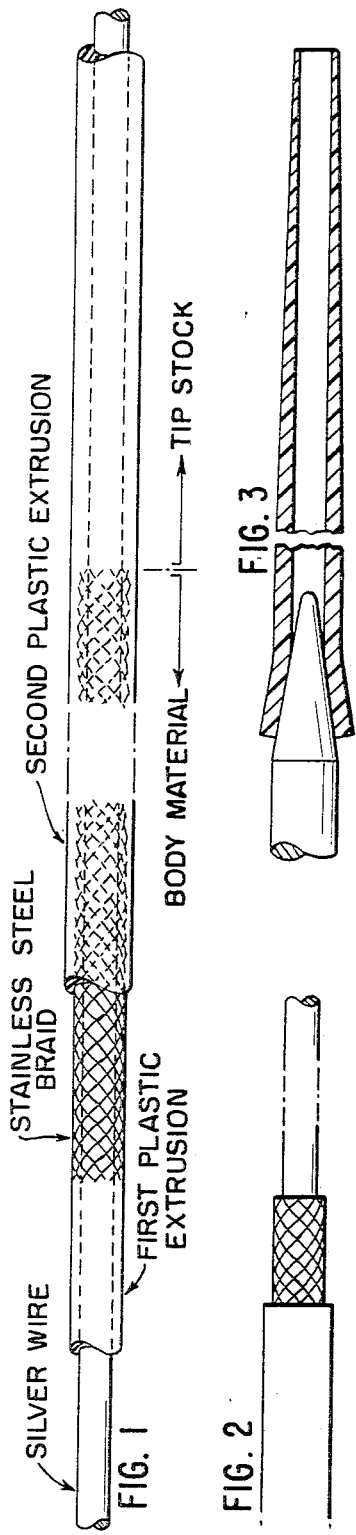
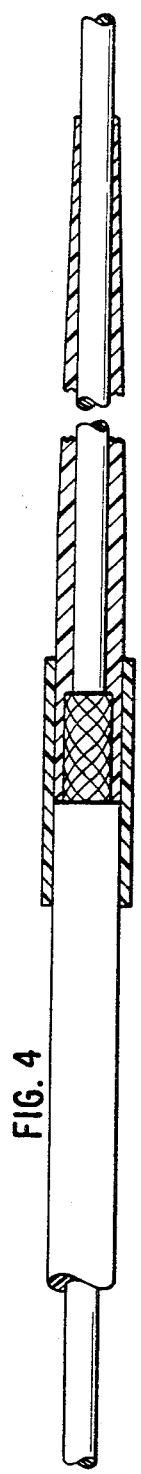
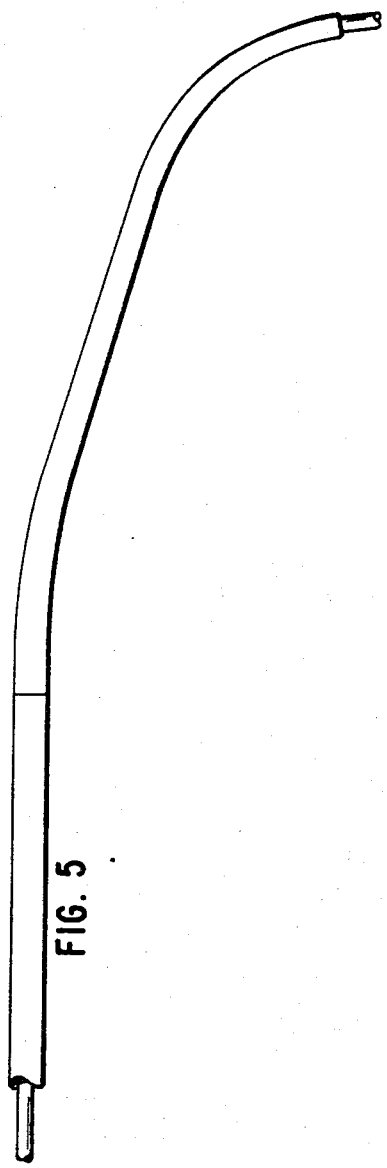
INVENTOR.
ROBERT C. STEVENS
BY
ATTORNEYS

United States Patent Office 3,485,234
Patented Dec. 23, 1969

3,485,234
TUBULAR PRODUCTS AND METHOD OF MAKING SAME
Robert C. Stevens, Miami, Fla., assignor to Cordis Corporation, Miami, Fla., a corporation of Florida
Filed Apr. 13, 1966, Ser. No. 542,265
Int. Cl. A61b 5/10; A61f 5/24; A61m 25/00
U.S. Cl. 128—2                                1 Claim

ABSTRACT OF THE DISCLOSURE

A guidable intravascular catheter is formed with a tubular body portion of flexible plastic and an intermediate braided wire sheath, providing longitudinal flexibility and torsional rigidity, and a tip of flexible thermoplastic capable of being heat set into a curved configuration.

---

This invention relates to the manufacture of tubular structures, in particular to catheters, and to an improved catheter construction.

Catheters of the type contemplated and their use are described in my copending application Ser. No. 490,253, filed Sept. 17, 1965.

The catheter tube construction of this invention features inner and outer plastic tubular sheaths, and an intermediate sheath of wire strands (which are preferably braided together) to impart maximum torsional control with minimum torsional deflection. The process of manufacture features the extrusion of the plastic onto a ductile wire mandril, which is subsequently stretched to reduce its diameter and thereby facilitate its removal from the plastic tube.

Intravascular catheters are long, flexible tubes designed to be inserted into a vein or artery in connection with certain medical techniques. Ofter the catheter is to be directed to a particular vascular location and must be guided into or past branching vessels, and it is an object of this invention to provide a catheter construction of improved adaptability to being guided. In particular, guiding of the catheter is partially controlled by providing a curved distal end which may be deflected, allowing for the straightening of the curved portion within the body. The catheter construction of this invention has been designed to provide a high degree of torsional control which is paramount in guiding of a catheter; in addition the catheters of this invention are flexible longitudinally yet substantially inelastic.

The catheter of this invention may be viewed as comprising a body portion, and a tip. These are preferably fabricated separately, each incorporating features such that in combination the desired characteristics are attained. It will be noted, however, that certain aspects of the manufacture and construction of these catheters are not limited to catheters and will be applicable to the manufacture of tubing in general.

In one such aspect, this invention provides a plastic tubing of high strength and with an extremely precise inner bore.

The body portion of the catheter is constructed to have high longitudinal flexibility and high torsional control, without being elastic. These properties have to be found to coexist in a tubing made up of an inner plastic tubular core, a braided wire intermediate sheath, and an outer plastic covering which penetrates through the interstices in the braid of the sheath and closely overlies the tubular core.

The tip portion is designed to direct the catheter during insertion into a selected vessel and is formed with a taper having one or preferably two curves, including a relatively sharp curve just before the distal end, and a less sharp curve a short distance proximally thereof. The curved tip does not require a braided sheath as it is preferably more flexible than the body portion.

Manufacture of the body portion is carried out by extruding a suitable plastic onto a ductile wire mandril, by conventional wire coating extrusion apparatus, then braiding a fine wire sheath tightly over the plastic coating, and then applying a second extruded layer of plastic over the braided sheath, preferably also interstitially of the braiding. During the braiding operation and second extrusion the wire mandril serves to support the inside of the tube and prevent it from collapsing.

After a run of body material has been made up, it is cut to length, and the wire center is then stretched to elongate it permanently and correspondingly reduce its diameter to facilitate its later removal.

A tip of plastic is next fashioned by molding, but preferably by cutting, proper lengths of the same plastic, also extruded onto the same size wire mandril, but without the provision of a braided sheath.

The tip stock is formed to the desired taper, and the proximal end is widened so that it may be slipped over the wire mandril and onto the body stock from which the second layer of plastic has been ground off to expose a small portion of the wire braid. The tip is fused to the body portion by heat and pressure. This can be accomplished by a two-cavity mold, between heated rollers, but preferably by slipping a piece of plastic shrinkable tubing over the joint and then heating the assembly which causes the shrinkable tubing to contract, melting and fusing the tip with the catheter body. The shrinkable tubing is then removed, assuring a firm joint and a completely smooth outer surface.

After the tip has been joined to the body stock, the wire mandril within the tip is bent to shape the tip which is then heat-set.

The catheter is then completed by removing the wire mandril and attaching a conventional needle hub fitting to the proximal end.

A preferred embodiment of the catheter of this invention, together with its method of manufacture, is described in greater detail below with reference to the accompanying drawings in which FIG. 1 is a fragmentary view showing the formation of the body material, with portions broken away to reveal structural details; FIG. 2 is a fragmentary view of the distil end portion of the body material prepared to receive a tip; FIG. 3 illustrates a tip in cross section being prepared for application to the end of the body material; FIG. 4 is a view, partly in section, illustrating the attachment of the tip to the body material; FIG. 5 is a view of the end of the catheter, still containing the mandril wire, with the tip bent with two curved portions.

The catheter is formed of stock prepared by extruding a semi-soft plastic elastomeric material onto a silver wire which may be between .030 and .090" in diameter depending on the size of the catheter to be formed. Typically, conventional extrusion apparatus of the type used to apply plastic insulation to electrical wire is employed, with an elastomeric polyurethane resin as the covering material.

The first extrusion, which is utilized in the preparation of the body material, is typically to a wall thickness of about one-third of the total wall thickness to be formed, for instance from about .010 to .030". This is applied to the total length of silver wire.

After the first extrusion, the wire is run through a conventional wire braiding machine and a tightly overlying braided sheath is formed. The braiding should be controlled so as to impart a high degree of torsional control to the body material. The wire is typically of stainless steel, having a diameter of .001–.003" braided to 25–40 picks per inch (mesh) with 8–20 strands of wire.

After the stainless steel braided sheath has been applied to the first extruded portion, a second extrusion of the same plastic is applied, under sufficient heat and pressure that the plastic substantially penetrates the interstices of the braid and comes into contact with the first extrusion. The second extrusion is to a wall thickness about double the first to build up the outside diameter of the body material to be between .039 and .183".

After the body material has been formed, the body material is cut into catheter lengths and the silver wire is stretched to reduce its diameter and facilitate its removal from the body material. It will be here observed that the extrusion of the stock onto the silver wire, which is present during the entire formative stages of the tubing, provides a tubing having an extremely accurately controlled inner bore.

After the wire has been stretched, it is left in place to serve as a support for the tip during its application to the body stock.

Tips are formed by molding or preferably by cutting lengths of about 3" each of tube stock having no braid in it and grinding them to a taper as illustrated in FIG. 3. About ⅛" of one end of the body stock is ground off the second plastic extrusion so as to expose the braid, as illustrated in FIG. 2; the wide end of the tip is spread open sufficiently to seat on the bared end, about 3" of shrink tubing is then seated loosely over the joint.

The tip portion of the assembly is heated to about 300° F. to cause the tip and body material to soften sufficiently to fuse with the end of the body and, at the same time, the shrink tubing contracts to provide bonding pressure and also to assure a smooth continuous plastic joint. The shrinkable tubing is then removed.

The tip is then provided with one or two bends, as described in copending application Ser. No. 490,253, filed Sept. 27, 1965.

With the tip thus bent, the end is immersed in boiling water for about 20 seconds, allowed to cool and the wire core is withdrawn. At this stage, the catheter is substantially complete and requires only the addition of a proximal fitting which may be a conventional female needle Luer Lok-type fitting, attached in conventional manner.

In use, the catheter is mounted on a manipulator by which it may be rotated during the procedure and which controls a deflector wire which extends the length of the catheter to about ¼" of its distal end, as described and claimed in copending application Ser. No. 490,253, filed Sept. 27, 1965. It will be noted, however, that the manipulator is provided with a slidable finger-controlled member, which is attached to the proximal end of the wire. This may be moved forward and back to retract and advance the wire, and it will be noted that, as the wire is advanced, the distal curve is straightened and the curve is resumed as the wire is withdrawn. In this manner, the combination of rotation and deflection provides an effective means of guiding the catheter during the procedure and permits it to be directed into branching vessels.

Suitable plastic materials include plasticized vinyl resins, polyethylene, the synthetic and natural rubbers and polyurethane elastomers, the latter being preferred. A typical suitable plastic is that sold under the trademark Estane and described in Modern Plastics Encyclopedia for 1965, at page 170.

Inasmuch as the progress of the catheter is observed by radiological techniques, it is preferable that the catheter be radiopaque. For this purpose, the plastic is preferably compounded to contain 40% by weight of bismuth subcarbonate U.S.P.

Other radiopaque materials in an amount sufficient to produce radiopacity may also be used.

The braided wire sheath is designed to impart torque control and may be modified so long as this characteristic is maintained. In actual practice, it is preferred that the body stock material have a torsional rigidity such that when a four foot length is bent with 10 inches wrapping through a 120° arc, and the proximal end is rotated, the distal end will follow the rotator without whipping.

Having thus disclosed my invention and described in detail a preferred embodiment thereof, I claim and desire to secure by Letters Patent:

1. An intravascular catheter having a distal end adapted to be formed into a curve and guided through branching blood vessels comprising a tubular member having a central inner bore which extends throughout its length and terminates in an opening at the distal end, said tubular member having a tip portion adjacent said distal end formed of a flexible thermoplastic material which is capable of being formed and heat set into the desired curved configuration by immersion in boiling water, and a body portion joined with said tip portion and forming the remainder of the tubular member, said body portion comprising an inner flexible plastic tubular core, an outer flexible plastic covering and an intermediate braided wire sheath terminating at said tip portion and being formed to impart torsional rigidity such that by rotating one end of said body portion in either direction the other end will follow in the same direction without whipping.

References Cited

UNITED STATES PATENTS

| | | | |
|---|---|---|---|
| 3,416,531 | 12/1968 | Edwards | 128—348 |
| 2,407,929 | 9/1946 | Jeckel | 128—349 X |
| 2,472,485 | 6/1949 | Krippendorf | 128—349 X |
| 2,690,769 | 10/1954 | Brown | 138—125 |
| 3,190,315 | 6/1965 | Taylor et al. | 138—127 |
| 3,258,031 | 6/1966 | French | 138—127 |

FOREIGN PATENTS

| | | |
|---|---|---|
| 370,415 | 2/1908 | France. |
| 4,816 | 1889 | Great Britain. |

DALTON L. TRULUCK, Primary Examiner

U.S. Cl. X.R.

128—348; 138—123